July 1, 1958 G. E. STROM ET AL 2,841,284
GAUGE
Filed April 13, 1955 4 Sheets-Sheet 1

INVENTOR.
HARRY D. WINTLE JR.
GEORGE E. STROM
BY
*JmCalimafde*
AGENT

INVENTOR.
HARRY D. WINTLE JR.
GEORGE E. STROM
BY
AGENT

INVENTOR.
HARRY D. WINTLE JR.
GEORGE E. STROM

July 1, 1958 G. E. STROM ET AL 2,841,284
GAUGE
Filed April 13, 1955 4 Sheets-Sheet 4

INVENTOR.
HARRY D. WINTLE JR
GEORGE E. STROM
BY
AGENT

United States Patent Office 2,841,284
Patented July 1, 1958

2,841,284

GAUGE

George E. Strom, Florence, and Harry D. Wintle, Jr., Northampton, Mass.

Application April 13, 1955, Serial No. 501,138

14 Claims. (Cl. 209—82)

This invention relates to a gauge for classifying elements such as springs, screws or the like, and particularly to an electronic gauge for automatic classification of such elements.

More specifically, this invention relates to a gauge which may be mechanically coupled to and derive its operating power from an existing machine which produces a machined element.

Gauges are known which are not adaptable for coupling to the machine producing the element to be classified and, therefore, it is necessary to accumulate the machined elements in a hopper, or similar device before classification. This procedure requires special apparatus for accumulating and positioning the elements for classification. One such gauge is known which employs a manually loaded device having a plurality of bores for supporting the machined elements. An operator manually places the elements in the bores and after the elements are properly in position, he operates a gauge which comprises a rotating arm, motor driven, having a plurality of depending shoes extending varying distances from the arm. As the arm rotates, the shoes contact different elements, depending on the lengths of the elements, and in this manner the elements are classified. By classification is meant the critical sorting of elements with respect to a particular characteristic or characteristics thereof.

It is an object of this invention to provide an improved and simplified high speed gauge.

It is a feature of this invention to provide a gauge which is coupled to the machine producing the element and is capable of classifying the element before the element is dispensed by the machine. In this way our invention obviates the need for a hopper, or positioning device.

It is a further feature of this invention to provide a gauge which derives its operating power from the existing machine and therefore requires no source of independent motive power.

It is a further feature of this invention to provide a gauge capable of classifying an element according to its size and accepting or rejecting the element.

It is another feature of this invention to provide a novel electronic circuit for automatic classification and acceptance or rejection of the machined element.

In accordance with an aspect of our invention there is provided a gauge for classifying a unit part in accordance with a dimension thereof. The gauge comprises an oscillating arm including a pair of sensing fingers. One of the fingers extends towards an end of the unit part a greater distance than the other finger, whereby when the fingers sweep across the end of the unit part the finger which contacts the unit part determines the classification thereof.

These and other features and objects of the invention will become more apparent when taken in conjunction with a description of the invention in which.

Although our invention is described in connection with a spring coiling machine, it is to be realized that the invention may be used for classifying any element or part, in accordance with a dimension thereof, without departing from the spirit and scope of the invention.

Figure 1:
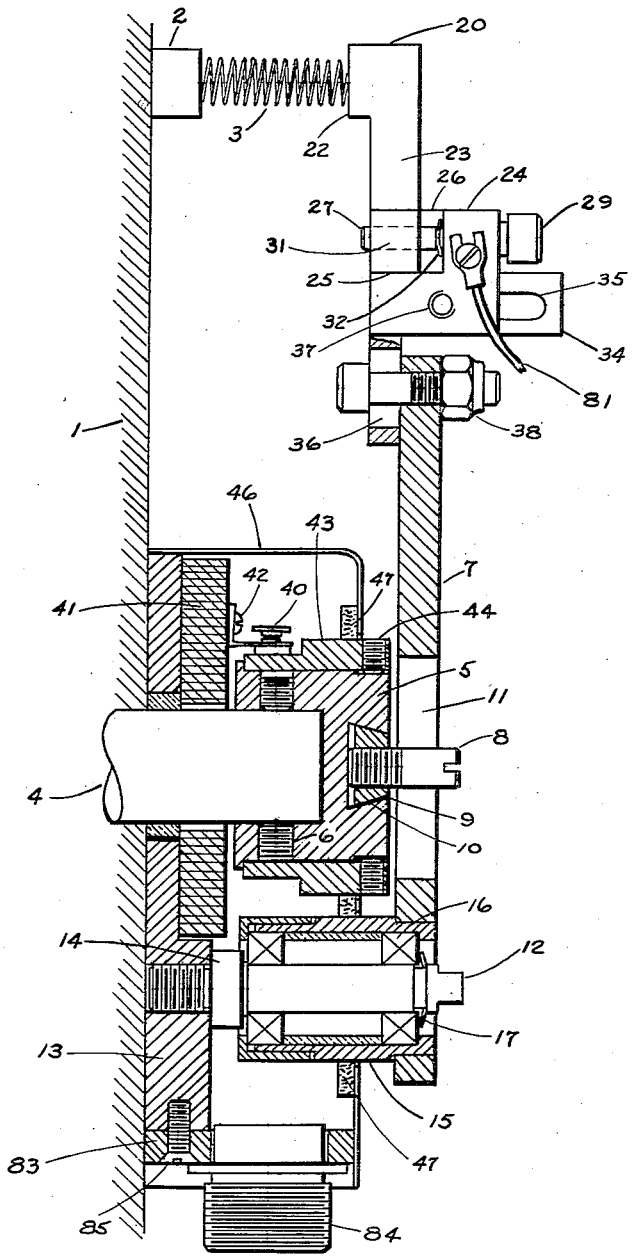
Fig. 1 is a cross-sectional view of the spring gauge coupled to a spring coiling machine.

Referring to Fig. 1, there is shown only that much of a typical spring coiling machine as is necessary for an understanding of the invention. The spring coiling machine comprises an end plate 1, a coiling point 2 against which the spring 3 is coiled, and a rotating shaft 4 which controls many of the moving parts of the spring coiler.

The gauge of our invention comprises an adaptor 5 securely mounted on the shaft 4 by means of set screws 6. An oscillatory arm 7 (Figs. 1 and 2) is driven by the adaptor 5 by means of drive pin 8 screwed into a V-block 9 which is slidable in a cooperating V-slot in the adaptor 5. The degree of eccentricity of the drive pin 8, or the extent of arm travel, is adjusted by simply loosening threaded pin 8 whereby the V-block 9 slides loosely in the V-slot 10. At a desired position the pin 8 is threaded into the V-block 9 thereby tightening the V-block against the sides of the slot 10. The rotation of the drive pin 8 produces oscillatory motion of the arm 7 by riding in a longitudinal slot 11 provided in the arm 7.

In most conventional spring coiling machines the shaft 4 makes one revolution with each spring produced by the machine. Thus, one complete revolution of the shaft 4 produces one complete cycle of oscillation of the arm 7. If a greater or lesser number of cycles of oscillations are required per number of revolutions, gears or other suitable speed differential means could be coupled between the shaft 4 and the adaptor 5. The start of the cycle of oscillation is adjusted by loosening the set screws 6 and rotating the adaptor 5 about the shaft 4 to a desired position.

The arm 7 is pivotally mounted on a stationary journal 12 which is screwed into a base plate 13 and against shoulder 14; the base plate 13 being attached to the coiling machine end member 1. The arm 7 is mounted preferably welded, on a journal box 15. The journal box 15 encloses suitable bearings 16 which bear against the journal 12. Longitudinal slippage of the arm 7 about the journal 12 is prevented by means of a retaining ring 17 mounted against one of the bearings 16.

Figures 2, 3, 4:
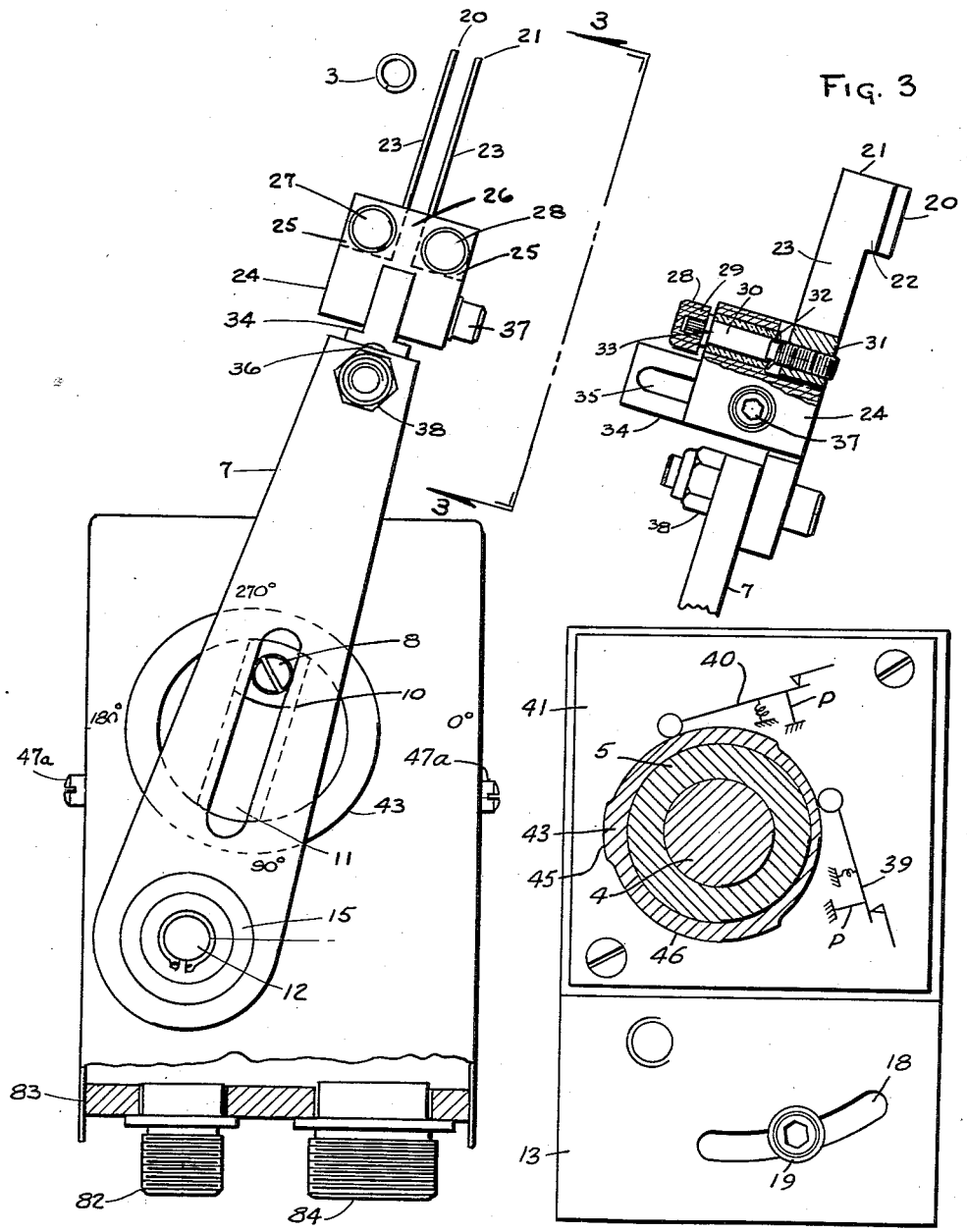
Fig. 2 is an end-view of the spring gauge shown partly in cross-section.
Fig. 3 is a view taken along lines 3—3 of Fig. 2, shown partly in cross-section.
Fig. 4 is an end view of the gauge with a portion removed, showing the cam in relation to a pair of switches controlling the electronic circuit.
Figure 4:
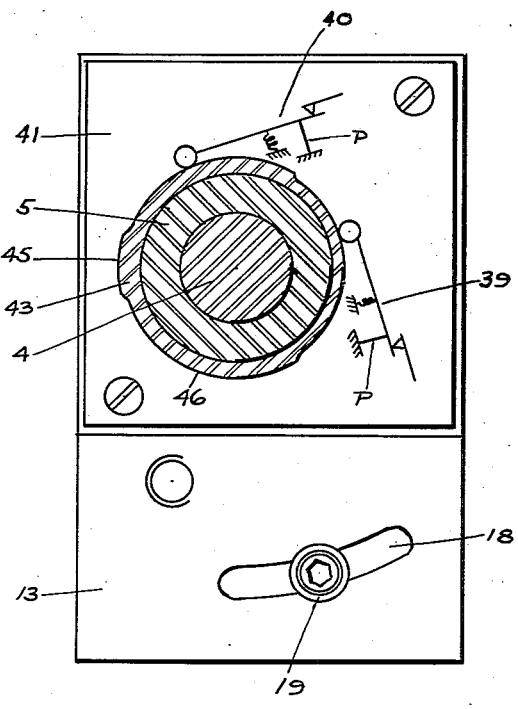

As best seen in Fig. 4, the base plate 13 includes an arcuate slot 18 whereby the complete gauge mechanism (which is attached to the base plate) is adjusted as to its initial position by pivoting the base plate 13 about the shaft 4 to a desired position. The base plate 13 is then rigidly secured by means of a screw 19 which is threaded into the end member 1.

A pair of sensing fingers 20 and 21 (Figs. 1, 2 and 3)

coupled to the arm 7 are swept across an end of the spring, making, or not making, physical and electrical contact with the spring and operating an electrical circuit which automatically classifies the springs. The fingers 20 and 21 are flat plate members each having a projecting nose portion 22 and a rectangular portion 23. The fingers 20, 21 are slidably mounted on a block 24 having a pair of cut-out portions 25 extending from opposite sides and leaving a partition 26 therebetween. The fingers 20 and 21 rest against opposite sides of the partition 26, and are moved by means of jack screws 27 and 28, each having a knurled head 29, a spindle portion 30 and a threaded portion 31.

The jack-screws are rotatably mounted in the block 24 behind the cut-out portions and restrained against longitudinal movement by means of retaining rings 32 and 33. Thus, by rotating the knurled heads 29, the fingers 20, 21 are caused to slide in the cut-out portions. In this manner one of the fingers is moved closer to the end of the spring than the other finger and the distance between the leading edges of the nose portions 22 determine the tolerance limits of the spring. The block 24 is adjustably mounted on an L-shaped slotted member 34, having a longitudinal slot 35 and a vertical slot 36. The block 24 is channeled to fit over the longitudinal portion of the member 34 and is secured by means of a bolt 37. The position of the block 24 on member 34 with respect to the end of the spring determines the free length of the spring. The block 24 may be angularly positioned with respect to the arm 7 and adjusted vertically by means of bolt and nut arrangement 38 passing through an opening in the arm 7 and through the slot 36 in member 34.

Referring for a moment to the relationship between the rotation of the shaft 4 and production of the spring 3, it is recalled that the shaft 4 makes one complete revolution with each spring produced. Therefore, the adaptor 5 is adjusted on the shaft 4 so that just as a spring is completed, the oscillating arm is ready to sweep across the end of the spring. For example, referring to Fig. 2, assuming the spring is completed and is in the position shown, the eccentric pin should then be at approximately 225° and moving in the direction indicated. Thus, at an instant after the spring is completed, the fingers pass across the end of the spring and either none, one, or both fingers will contact the spring depending on the length of the spring. This information is momentarily stored in an electrical circuit, and assuming that it requires a half cycle for a new spring to come into position, the electrical circuit operates a device for either accepting or rejecting the spring by the time the eccentric drive pin 8 reached 0°.

The timing of the acceptance or rejection device is controlled by switches 39 and 40 (Figs. 1 and 4) mounted on an insulated supporting plate 41 by means of screws 42, and actuated by a cam 43. The cam 43 is securely mounted on the adaptor 5 by means of set screws 44. Switch 39 is adapted to operate in response to a depression on the cam surface and energizes the acceptance or rejection device which, for example, may be a solenoid operated air valve. The air valve remains energized as long as the breaker points of switch 39 remain in the depression of the cam which is approximately 120° of cam rotation. The rise 45 on the cam operates switch 40 which clears the memory circuit and prepares it for the next spring. The switches are shown simply as spring tensioned, make and break type switches movable on pivot points P. The timing of the air valve is adjusted by rotating cam 43 on the adaptor 5 to a desired position. Thus, the information is stored during that period when the intermediate level 46 of the cam passes under switch 40; the information is operated upon, or the air valve is energized during that period when the depressed level of the cam passes under switch 39, and the electrical circuit is cleared when the rise 45 in cam level passes under switch 40. The effect of operation of these switches is explained in detail in connection with Fig. 5.

A housing 46 is provided to keep the dust and dirt which reaches the cam and switches, at a minimum. The housing 46 is sealed to the cam 43 and journal housing 15 by means of felt seals 47 and fastened to the base plate by means of screws 47a (Fig. 2).

Before discussing the electrical circuit, it is observed that if the finger 21, which is further from the end of the spring, misses the spring, and the finger 20, which is closer to the end of the spring contacts the spring, a signal is transmitted to the electrical circuit indicating that the spring is of acceptable length. If the finger 21 contacts the spring then, of course, finger 20 also contacts the spring, and the signal transmitted indicates that the spring is too long; and, if neither finger contacts the spring, then the signal transmitted indicates that the spring is too short. The improperly dimensioned spring is rejected and the correctly dimensioned spring is accepted.

Figure 5:
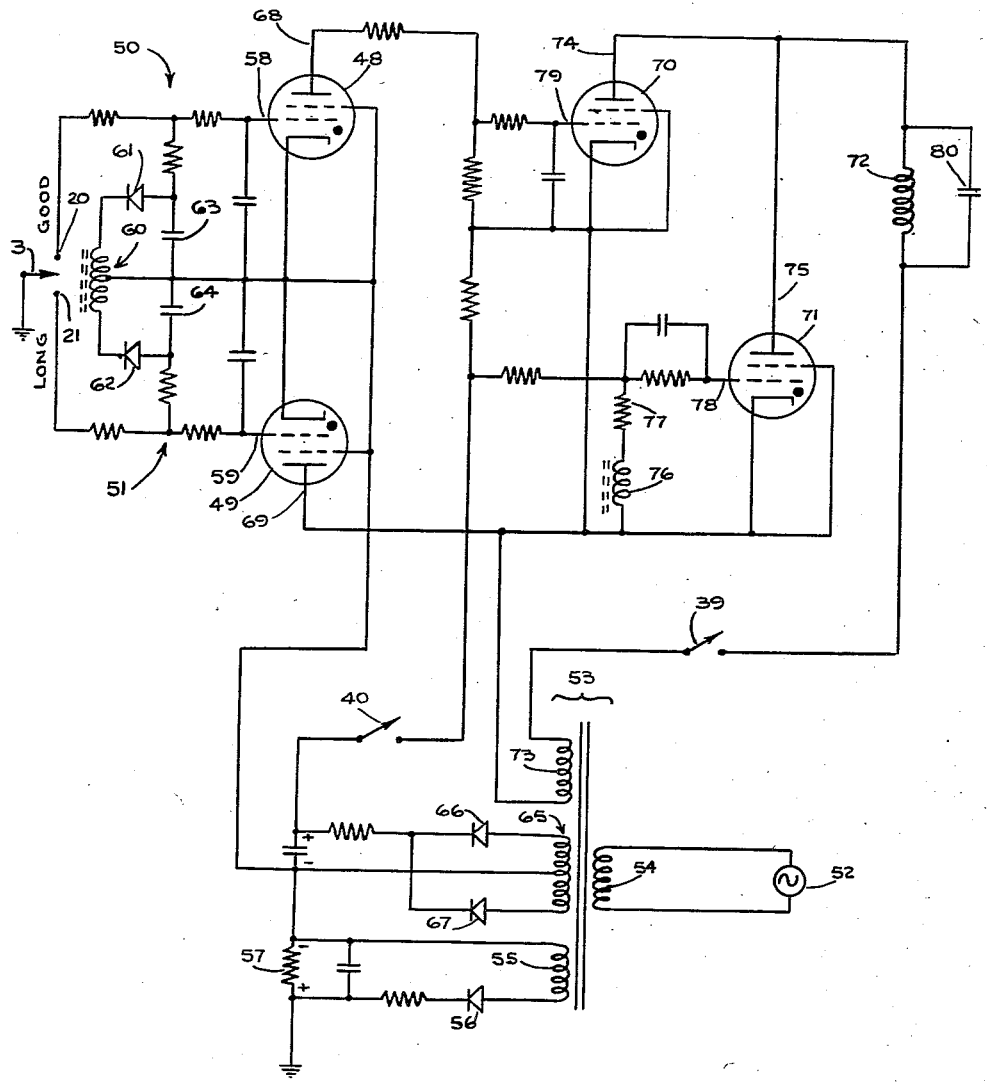
Fig. 5 is a schematic diagram of the electronic circuit.

Referring now to Fig. 5, the spring 3 is illustrated as a grounded contact and the fingers 20 and 21 as terminals marked "good" and "long." That is, the spring is "good" if only finger 20 is contacted thereby, and the spring is "long" if both fingers are contacted thereby.

The terminals 20 and 21 are coupled respectively to electron tubes 48 and 49, which are preferably thyratrons, over their grid biasing circuits indicated at 50 and 51. The tubes 48 and 49 are normally biased to cut-off by the biasing potentials applied to their grid and cathode circuits from bias winding 60. The tube potentials are derived from a plurality of secondary windings of a transformer 53 having its primary 54 coupled across the power supply 52. The "spring measuring" potentials for tubes 48 and 49 are derived from secondary winding 55, rectified by rectifier 56 (half wave) and developed across resistor 57. The biasing potential is rectified by rectifiers 61, 62 and filtered by capacitors 63, 64. The tubes 48, 49 derive their plate supply voltage from secondary winding 65, which voltage is rectified by rectifiers 66, 67 and applied over switch 40 to the anodes 68 and 69 of tubes 48 and 49. By way of example, if the power supply voltage 52 were 110 volts, then suitable potentials for the plate, grid and cathode electrodes of tubes 48 and 49 would be 130 volts, −8 volts and zero volts respectively.

The tubes 48 and 49 remain in the cut-off condition until a spring contacts either one or both terminals 20, 21. Upon the spring 3 contacting terminal 20 and coupling it to ground, the positive potential across resistor 57 will appear across resistor network 50. This positive potential is high enough to overcome the −8 volts biasing potential on control grid 58 of tube 48. The resulting positive potential at grid 58 is sufficient to fire tube 48. Tube 49 would similarly fire if the spring contacted terminal 21. It is seen that one or both tubes may assume the fired condition and such condition is maintained until switch 40 is opened by operation of the cam.

The tubes 48 and 49 are a form of memory device because they assume a particular condition in response to a signal and maintain that condition until acted upon by an external circuit (switch 40). Coupled to the thyratrons 48 and 49 are a second pair of thyratrons 70 and 71 which control a solenoid air valve 72 (only the winding of which is shown). The solenoid 72 is coupled in the anode circuits of tubes 70, 71 so that firing of either tube operates the solenoid to produce an air blast which blows the spring away, assuming that an acceptable spring falls into a hopper below the coiling point member 2. Thus, if the spring is acceptable neither tube 70 or 71 fires; however, if the spring is too short, tube 70 fires, and if the spring is too long, tube 71 fires.

The plate supply for tubes 70, 71 is derived from secondary winding 73, and applied over switch 39 to the respective anodes 74 and 75. Tube 71 is normally biased to cut-off by a biasing potential derived from secondary winding 76. Tube 71 is fired in response to the conduction of tube 49, whereby a positive potential developed across resistor 77 is applied to the control grid 78. Tube 49 is rendered conducting when a spring contacts the "long" terminal 21 and thus the spring is rejected.

If a short spring is coiled, it is not sensed by either finger and therefore does not make contact with terminal 20 or 21, and neither tube 48 or 49 is fired. As a result, tube 70 has zero bias on its control grid 79, causing it to fire, and thereby energizing solenoid 72 in its anode circuit, and rejecting the short spring.

When a spring of the correct length is coiled, it contacts only the "good" terminal 20, firing tube 48 and producing a negative cut-off bias on the grid 79 of tube 70.

Capacitor 80 coupled across the solenoid 72 is a filter capacitor to provide uninterrupted current in the solenoid during conduction of tubes 70 or 71.

Referring to Fig. 1, an electrical lead 81 is shown electrically coupled to finger 20 via jack screw 28. For simplicity, the lead 81 is shown broken. A similar lead is coupled to finger 21. The leads 81 are passed to a connector 82 in a receptacle plate 83 (Figs. 1 and 2). The leads (not shown) from the switches 39 and 40 are passed to connector 84. The receptacle plate is fastened to the base plate 13 by means of screw 85.

Although a solenoid air valve is disclosed, it is to be realized that other forms of sorting devices may be employed. For example a solenoid may be used to control a trap door in a hopper and separate larger springs in this manner. Moreover, two solenoids may be used, one coupled in the anode circuit of each tube 70 and 71; the gauge would then separate springs into three groups, namely, long, good and short.

While there is described herein the principles of operation of the invention together with an embodiment thereof, it will be understood that the apparatus disclosed is only illustrative and that other means and apparatus may be employed without departing from the spirit and scope of the invention as defined by the appended claims.

What is claimed is:

1. An electronic gauge adapted to be coupled to a machine having a rotating shaft, means coupling said gauge to said shaft so that the gauge derives its operating power from the rotation of said shaft, said gauge being capable of classifying an element produced by said machine in accordance with the length of said element after it is formed, said gauge comprising an arm, said coupling means coupling said arm to said shaft so that the arm oscillates in response to the rotary motion of said shaft, a pair of finger members mounted at one end of said arm, the arm and fingers being so positioned that the fingers sweep across one end of said machined element after the formation thereof, which end terminates its length, one of said fingers extending towards said element a greater distance than the other finger, an electrical circuit coupled to each of said fingers, said circuits being operative in response to contact between said element and said fingers, and means including said circuits for physically displacing said element when contact is made, whereby classification is determined by the particular finger which contacts said machined element.

2. The gauge according to claim 1, wherein said machined element is positioned substantially parallel to said shaft, said arm being coupled substantially perpendicularly to said shaft, and said fingers extending perpendicularly to said arm and in a direction towards said machined element.

3. The gauge according to claim 1, wherein said coupling means comprises an adaptor member securely mounted on said shaft, driving means mounted off-center on said adaptor member relative to said shaft, and coupled to said arm, whereby the rotation of said driving means about the shaft axis causes said arm to oscillate.

4. The gauge according to claim 3, wherein said driving means comprises a pin mounted off-center with respect to the shaft axis, and said arm having an elongated opening wherein said pin is adapted to slide.

5. A gauge for classifying a formed spring according to its length, adapted to be mounted on a spring coiling machine, the coiling machine having a driving shaft which rotates a given number of times for each spring produced, and supporting means for supporting the spring substantially parallel to said shaft; said gauge comprising an arm, means coupling said arm substantially at right angles to said shaft and in power deriving relationship therewith, said coupling means including driving means mounted off-center relative to the shaft axis whereby the rotation of said shaft causes said arm to oscillate, a pair of sensing fingers mounted at one end of said arm and positioned to move across an end of the spring after the formation thereof, which end terminates the length of the spring, the ends of one finger extending a greater distance toward the end of the spring than the end of the other finger, whereby classification may be determined by the finger which contacts said spring.

6. The gauge according to claim 5, and further comprising electrical means coupled to at least one of said fingers for producing a predetermined ejection of an unacceptable spring.

7. The gauge according to claim 6, wherein said electrical means comprises a solenoid adapted to operate an air blast, circuit means coupled between said fingers and said solenoid, and operative in response to either of said fingers contacting, or not contacting, said spring for operating said solenoid, whereby an unacceptable spring is displaced by operation of said air blast.

8. The gauge according to claim 7, wherein said circuit means comprises storage means for storing information corresponding to the classification of said spring, and control means coupled to the output of said storage means for operating said solenoid in response to the information stored in said storage means, whereby both fingers are moved across the end of said spring before said solenoid is operated.

9. The gauge according to claim 5, and further comprising means for adjusting the distances between the ends of said fingers and the end of the formed spring, whereby for a spring of acceptable length the first of said fingers to sweep past said spring is adjusted to miss it and the other finger is adjusted to contact it.

10. The gauge according to claim 9, and further comprising a storage device coupled to each of said fingers, for storing an electrical condition in said device in response to said fingers either contacting or missing said spring, a solenoid adapted to operate an air blast for displacing an unacceptable spring, control means coupled between said storage device and said solenoid and operative in response to the condition stored in said storage device, for operating said solenoid.

11. The gauge according to claim 10, wherein said storage device comprises first gas-discharge tubes coupled to each of said fingers respectively, each of said tubes including cathode, grid and anode electrodes, means for grounding each of said tubes when the associated finger contacts said spring, whereby the condition of the tubes indicates the length of the formed spring relative to its acceptability.

12. The gauge according to claim 11, wherein said control means coupled between said storage devices and said solenoid comprises a second pair of discharge devices coupled respectively to the output of said first tubes, biasing means for said second pair of discharge devices, and switching means under control of said shaft for coupling said biasing means to said second pair of discharge devices immediately after a condition is stored in said first tubes, the output of said first tubes in conjunction with said biasing means determining the condition of said second pair of discharge devices.

13. The gauge according to claim 12, wherein said gas-discharge tubes comprise thyratrons.

14. The gauge according to claim 12, wherein said switching means comprises a cam disc, a pair of switches adapted to be operated by said cam, one of said switches opening said electrical circuit, to clear it, after a complete stroke of the oscillating arm, and the other of said switches applying said biasing means to said second pair of tubes before said one switch opens.

References Cited in the file of this patent

UNITED STATES PATENTS

| | | |
|---|---|---|
| 1,627,699 | Greswald | May 10, 1927 |
| 1,713,690 | Crosman | May 21, 1929 |
| 1,828,176 | Crosman | Oct. 20, 1931 |
| 2,409,265 | Fenton | Oct. 15, 1946 |
| 2,645,341 | Diamond | July 14, 1953 |
| 2,664,557 | Sargrove | Dec. 29, 1953 |